(12) United States Patent
Masunari et al.

(10) Patent No.: US 6,325,171 B1
(45) Date of Patent: Dec. 4, 2001

(54) VEHICLE POWER SUPPLY SYSTEM

(75) Inventors: Shoji Masunari; Eiji Shimochi, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 59 days.

(21) Appl. No.: 09/064,083

(22) Filed: Apr. 22, 1998

(30) Foreign Application Priority Data

Apr. 22, 1997 (JP) .................................................. 9-104534

(51) Int. Cl.⁷ .................................................. B60K 28/10
(52) U.S. Cl. .................................................. 180/279; 274/282
(58) Field of Search .................................................. 180/279, 283, 180/274, 282; 307/10.1

(56) References Cited

U.S. PATENT DOCUMENTS

| | | | |
|---|---|---|---|
| 3,406,774 | * 10/1968 | Lacey | 180/279 |
| 3,443,658 | * 5/1969 | Culp | 180/279 |
| 3,668,627 | * 6/1972 | Brainerd | 340/52 |
| 3,980,318 | * 9/1976 | Balban | 280/150 |
| 5,311,065 | * 5/1994 | Kondo | 307/10.1 |

FOREIGN PATENT DOCUMENTS 6-321027   11/1994   (JP) .

* cited by examiner

*Primary Examiner*—J. J. Swann
*Assistant Examiner*—James S. McClellan
(74) *Attorney, Agent, or Firm*—Morgan, Lewis & Bockius LLP

(57) ABSTRACT

A vehicle power supply system is disclosed which comprises a collision detecting member for detecting a collision of the vehicle, a power line supplying electric power from a power source portion to a plurality of loads, a fuse connected to the power line so that the fuse is fused when over-current flows therein, and an over-current generating member for causing the over-current to flow in the fuse to fuse the fuse when the collision detecting member detects the collision of the vehicle.

9 Claims, 2 Drawing Sheets

VEHICLE POWER SUPPLY SYSTEM

BACKGROUND OF THE INVENTION

1. Technical Field of the Invention

This invention relates to a vehicle power supply system, and is applicable to the prevention of a vehicle fire which is caused by the power supply damage which may occur at the time of vehicle collision.

2. Description of the Related Art

Recently, a variety of electronic devices (hereinafter referred to as "loads", when applicable) have been mounted on vehicles. Power supply lines, control lines, and output lines to those loads are bundled into a wire harness or harnesses so that power is supplied to the loads and the loads are connected to one another.

Electric power is supplied to the load from the battery. In this connection, in order to prevent the occurrence of troubles in the power supply system, a kind of fuse, namely, a fusible link is provided which is longer in fusing time than an ordinary fuse. Through the fusible links, power is supplied to the load from the battery.

If the cover of the power line connected to such a load, is removed and grounded, then large current flows from the battery, so that the part of the power line (wire) thus grounded is heated greatly to set out a fire; however, a large current flows in this manner, the fusible link is fused to interrupt the flow of current from the battery, thereby to prevent the occurrence of a fire, to secure the vehicle.

As was described above, a trouble occurs with the power supply system in a conventional vehicle, the fusible link connected to the battery is fused with the large current occurred by the trouble to secure the vehicle.

On the other hand, in the case where the load is located away from the battery, and its operating current is small, the power supply line is relatively thin, and accordingly high in resistance. Hence, even if the cover of the power supply line is removed and grounded; that is, even if over-current flows through the power supply line, the fusible link is not fused. Accordingly, it is impossible to prevent the occurrence of a fire which is due to the over-heating of the power supply line.

In order to overcome the above-described difficulty, a power supply interrupting system has been proposed in Unexamined Japanese Patent Publication Hei 6-321027. The system is as shown in FIG. 3. That is, a current detecting section 4 to detect the amount of a current flowing through a fusible link 2 is provided on a power supply line 3, and a total current calculating section 8 is provided which calculates the value of current used by an electronic device (load) which receives electric power through the power supply line 3. Furthermore, a control section 9 compares the value of current detected by the current detecting section 4 with the total current value calculated by the total current calculating section 8, thereby to determine whether or not a power trouble occurs. In the case it is determined where the power trouble has occurred, a control voltage is applied to a silicon controlled rectifier (SCR) 5.

When the control voltage is applied to the control terminal of the SCR 5, the SCR 5 is rendered conductive, so that a large current flows through the fusible link 2 and the SCR 5 from the battery 1. As a result, the fusible link 2 is fused, so that the supplying of electric power to the loads on the vehicle is interrupted; that is, the vehicle is secured.

In FIG. 3, a vehicle monitoring control system 6 detects and monitors the operating conditions of the various devices, whether or not electric power is supplied to them, through a state monitoring section 7. The data thus are supplied to the total current calculating section 8. The values of currents used for the various devices (when electric power is applied to the devices) are previously stored in the total current calculating section 8. The total current calculating section 8 calculates the total current value of the devices in which the power is supplied, which is input by the state monitoring section 7, with reference to the stored current values and applies the total current value to the control section 9.

Namely, the power interrupting system shown in FIG. 3 is designed as follows: That is, when a trouble occurs with the power supply system, the current detecting section 4 detects an abnormal current pulse, and the control section determines it as an abnormal pulse and applies the result of determination to the SCR 5, so that fusible link 2 is fused.

However, in the above-described fire preventing system, the over-current which attributes to the dead short or rare short of the power line is determined from a delicate pulse difference. This determination is considerably difficult, and suffers from a problem which makes it difficult to positively prevent a vehicle fire.

Further, the current detecting section 4 shown in FIG. 3 is expensive. Hence it is rather difficult to employ it in the power source system.

SUMMARY OF THE INVENTION

In view of the foregoing, an object of the invention is to provide a simple vehicle power supply system which is able to positively prevent the fire which breaks out because of the power line which may be damaged at the time of collision of a vehicle.

According to the first aspect of the present invention, as shown FIG. 1 showing a fundamental configuration of the system, there is provided a vehicle power supply system, which is constructed that electric power from an electric source section 30 to a load 32 through a power line 31 mounted on a vehicle, comprises: collision detecting section 33 for detecting the collision of the vehicle; a fuse 34 connected to a power line 31 so that it is fused when over-current flows therein; and over-current generating section 35 for causing over-current to flow in the fuse 34 to fuse the fuse 34 when the collision detecting section 33 detects the collision of the vehicle.

Hence, the system functions as follows: When the vehicle collides with something, the collision of the vehicle is detected by the collision detecting section 33, and the over-current generated by the over-current generating section 35 flows in the fuse 34. As a result, the fuse 34 is fused, so that the supplying of electric power to the power line 31 and the load 32 which are connected to subsequent stage of the fuse 34. This feature positively prevents the vehicle fire which attributes to the damage of the power line 31 or the load 32 which may occur at the collision of the vehicle, although the system is simple in arrangement.

According to the second aspect of the present invention, the collision detecting section 33 is an acceleration sensor mounted on the vehicle.

In this manner, the collision of the vehicle can be detected with the acceleration sensor which is generally used with an air bag system or door unlock system. Hence, it is unnecessary to additionally provide the collision detecting section 33, which furthers simplifies the construction of the vehicle power supply system.

According to the third aspect of the present invention, the over-current generating section 35 is a switch circuit which is closed when the collision detecting section 33 detects the collision of the vehicle, one end of the circuit is connected in the vicinity of the fuse 34 on the power line 31 connecting the fuse 34 with the load 31, and the other end of the circuit is grounded.

In this manner, upon collision of the vehicle, short-current flows from the power source section 30 through the fuse 34 and the switch circuit, so that the fuse 34 is forcibly fused. Hence, the over-current generating section 35 may be a switch circuit which is simple component, and accordingly the vehicle power supply system may be further simplified in circuitry.

Further, according to the fourth aspect of the present invention, a plurality of loads 32 are connected to subsequent stage of the fuse 34 through the power line 31.

In this manner, once the one fuse 34 is fused upon collision of the vehicle, the supplying of electric power to all the loads 32 connected to subsequent stage of the fuse 34 is interrupted. Hence, it is unnecessary that the over-current detecting section 35 is provided for each power line or each load. This feature further simplifies the arrangement of the system.

DETAILED DESCRIPTION OF THE PREFERRED EMBODIMENTS

Description will be given below in detail of one preferred embodiment of the present invention with reference to the accompanying drawings.

Figure 1:
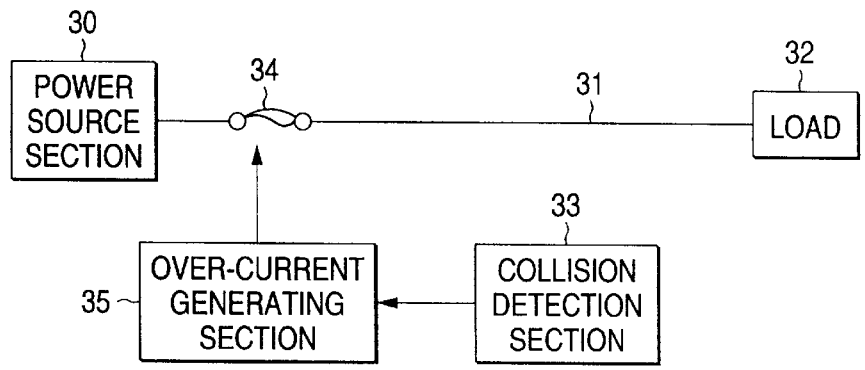
FIG. 1 is a block diagram showing the fundamental configuration of a vehicle power supply system according to the present invention.
Figure 2:
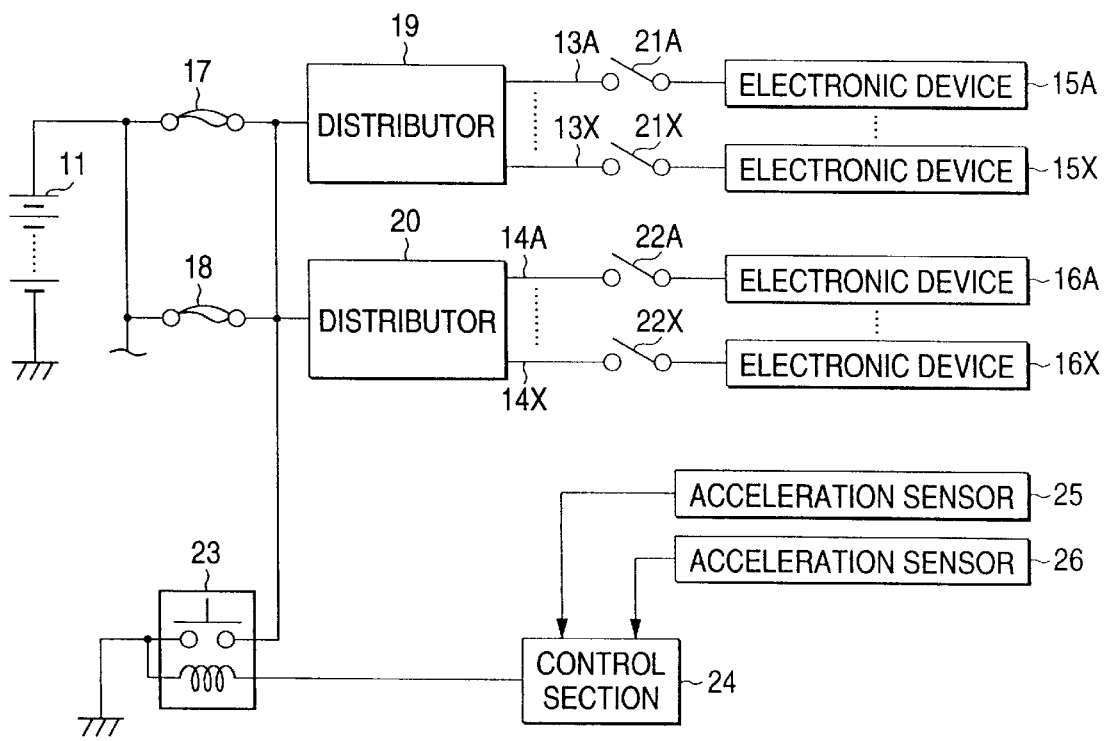
FIG. 2 is a circuit diagram, partly as a block diagram, showing the configuration of the vehicle power supply system according to the present invention.
Figure 3:
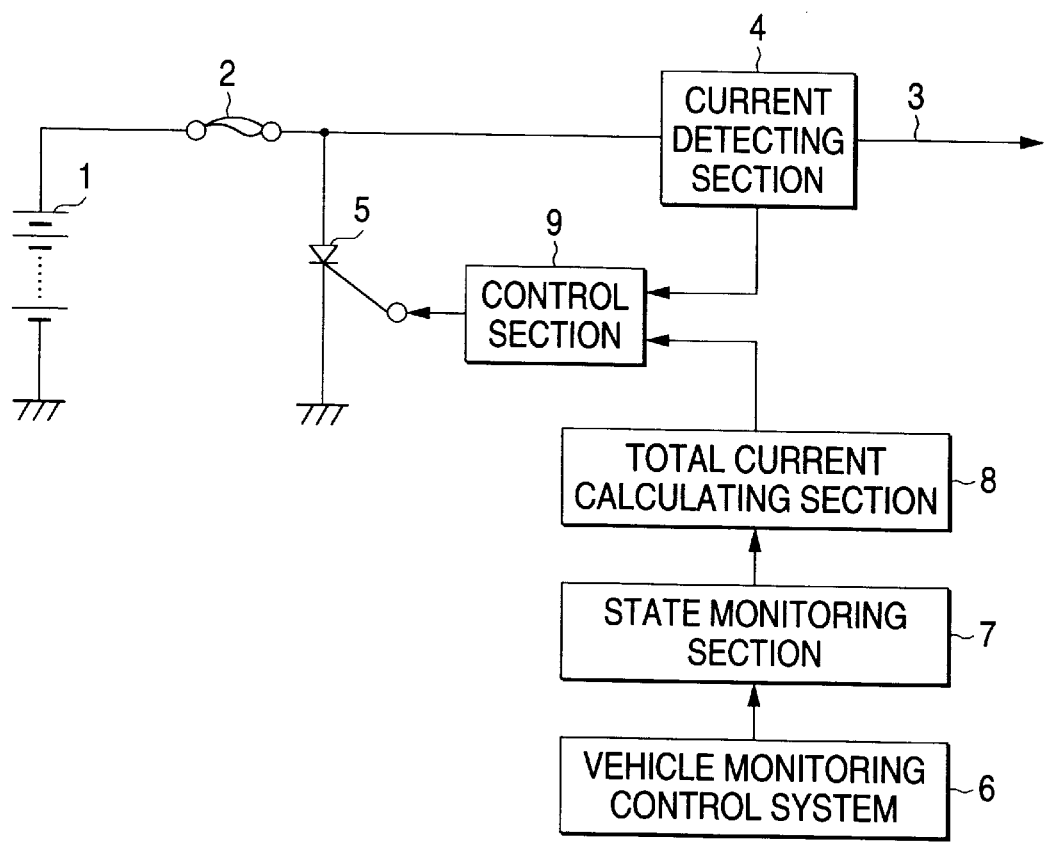
FIG. 3 is a circuit diagram, partly as a block diagram, showing the configuration of an example of a conventional power interrupting system.

FIG. 2 shows an example of the vehicle power supply system according to the present invention. The electric power of a battery 11 as an electric source section is suitably applied through fusible links 17 and 18, distributors 19 and 20, power lines 13A through 13X and 14A through 14X, and switches 21A through 21X and 22A through 22X to a plurality of electronic devices (or loads) 15A through 15X and 16A through 16X. Here, whether the electronic devices 15A through 15X and 16A through 16X are operated or not depends on whether the switches 21A through 21X and 22A through 22X are turned on or off.

In addition to the above constitution, there is provided a power source cut relay 23 whose one end of the power source cut relay 23 is connected to the vicinity of the fusible link 17 and 18 on the power lines connecting the fusible link 17 and 18 with the electronic devices 15A through 15X and 16A through 16X and whose the other end is grounded, and there is provided a control section 24 controlling open or close of the power source cut relay 23 by the application of a suitable control voltage to a control coil of the power source cut relay 23.

The control section 24 receives acceleration signals from acceleration sensors 25 and 26 as vehicle collision detecting devices and closes the power source cut relay 23 if the acceleration signals indicate the collision of the vehicle. The acceleration sensor 25 is accommodated in the air bag system of the vehicle, while the acceleration sensor 26 is provided in the door unlock system.

In this manner, when the vehicle collides with something, the collision is detected by the acceleration sensors 25 and 26 and the power source cut relay 23 is closed. As a result, over-current flows through the fusible links 17 and 18, so that the fusible links 17 and 18 are fused off. Accordingly, the supply of power to the power lines 13A through 13X and 14A through 14X, and to the electronic devices 15A through 15X and 16A through 16X which are located subsequent stage of the fusible links 17 and 18 is interrupted. Thereby, a vehicle fire due to the engaging short of the power lines 13A through 13X and 14A through 14X which may occurs at the time of collision is positively prevented.

In the above described system, upon collision of the vehicle, large current is forcibly caused to flow to the fusible links 17 and 18 to fuse them. Therefore, although the system is simple in construction, when a vehicle fire breaks out because of the damage of the power lines 13A through 13X and 14A through 14X at the collision of the vehicle, can be positively prevented.

Furthermore, in the system, the collision detecting section for detecting the collision of a vehicle includes the acceleration sensors 25 and 26 which are generally employed in a vehicle air bag system or door unlock system. This means that it is unnecessary to additionally provide collision detecting devices; that is, the system is simplified as much.

Although the acceleration sensors 25 and 26 provided in the air back system or the door unlock system are utilized as the collision detecting devices in the embodiment, however, the present invention is not limited thereto or thereby. That is, many fine wires stretched around the vehicle body may be employed for detecting the vehicle collision by cutting thereof.

Moreover, although the over-current generating device is the power source cut relay 23 in the embodiment, however, the present invention is not limited thereto or thereby. That is, any circuit may be employed which, when the collision of a vehicle is detected, flows an over-current to fuse the fusible link.

As has been described heretofore, according to the first aspect of the present invention, the vehicle power supply system can be realized which positively prevents the vehicle fire which attributes to the damage of the power line or the load which may occur at the collision of the vehicle, although the system is simple in arrangement.

According to the second aspect of the present invention, it is unnecessary to additionally provide the collision detecting devices, which furthers simplifies the construction of the vehicle power supply system.

According to the third aspect of the present invention, the over-current generating device may be a switch circuit which is simple in arrangement, and accordingly the vehicle power supply system may be further simplified in circuitry.

According to the fourth aspect of the present invention, it is unnecessary that the over-current detecting device is provided for each power line or each load. This feature further simplifies the arrangement of the system.

What is claimed is:

1. A vehicle power supply system comprising:

a collision detecting member for detecting a collision of the vehicle;

a power line supplying electric power from a power source portion to a plurality of loads;

a fuse connected to the power line so that the fuse is fused when over-current flows therein; and an over-current generating member for causing the over-current to flow in the fuse to fuse the fuse when the collision detecting member detects the collision of the vehicle.

2. The vehicle power supply system as set forth in claim 1, wherein the collision detecting member includes an acceleration sensor mounted on the vehicle.

3. The vehicle power supply system as set forth in claim 1, wherein the over-current generating member is a switch circuit which is closed to short the fuse when the collision detecting member detects the collision of the vehicle, one end of the circuit is connected in the vicinity of the fuse on the power line connecting the fuse with the load, and the other end of the circuit is grounded.

4. The vehicle power supply system as set forth in claim 1, wherein the plurality of loads are connected to subsequent stages of the fuse through the power line.

5. The vehicle power supply system as set forth in claim 2, wherein the over-current generating member is a switch circuit which is closed to short the fuse when the collision detecting member detects the collision of the vehicle, one end of the circuit is connected in the vicinity of the fuse on the power line connecting the fuse with the load, and the other end of the circuit is grounded.

6. The vehicle power supply system as set forth in claim 2, wherein the plurality of loads are connected to subsequent stages of the fuse through the power line.

7. The vehicle power supply system as set forth in claim 3, wherein the plurality of loads are connected to subsequent stages of the fuse through the power line.

8. A method to interrupt supplying electric power for a vehicle comprising the steps of:

detecting a collision of the vehicle by a collision detecting member;

generating a collision detecting signal by the collision detecting member when the collision is detected;

shorting a switch circuit connected to a fuse by the collision detecting signal;

causing the over-current to flow in the fuse when the switch circuit is shorted;

fusing the fuse by the over-current.

9. The method to interrupt supplying electric power for a vehicle as set forth in claim 8, wherein the collision detecting member includes an acceleration sensor mounted on the vehicle.

* * * * *